W. F. KIESEL, Jr.
BRAKE RIGGING.
APPLICATION FILED NOV. 17, 1910.

1,022,424.

Patented Apr. 9, 1912.

WITNESSES:
A. S. Diven
M. E. Verbeck.

INVENTOR
William F. Kiesel, Jr.
BY
Eugene Diven
ATTORNEY

UNITED STATES PATENT OFFICE.

WILLIAM F. KIESEL, JR., OF ALTOONA, PENNSYLVANIA.

BRAKE-RIGGING.

1,022,424.　　　　　Specification of Letters Patent.　　　Patented Apr. 9, 1912.

Application filed November 17, 1910. Serial No. 592,831.

*To all whom it may concern:*

Be it known that I, WILLIAM F. KIESEL, Jr., a citizen of the United States, residing at Altoona, in the county of Blair and State of Pennsylvania, have invented a new and Improved Brake-Rigging, of which the following is a specification.

This invention relates to improvements in brake riggings for railway car trucks; and more particularly to a brake rigging adapted for use in connection with the four wheel motor car truck described in my application for Letters Patent of the United States, filed of even date herewith Serial No. 592,830.

The objects of my improvements are to provide a simple arrangement of brake rigging comprising independent duplex brakes for each side of the truck; to so proportion the leverage ratio of the brake levers as to furnish the desired differential brake power to the two wheels on each side of the truck; and to eliminate the use of levers between the truck frame transom and the motor axle, as heretofore used.

While this brake rigging is particularly designed to accomplish the objects above set forth, I do not wish to be understood as confining it to use in connection with motor trucks only.

I attain my objects by arranging and assembling the several parts of the brake rigging, and applying them to the truck, in the manner illustrated in the accompanying drawings, in which—

Figure 1:
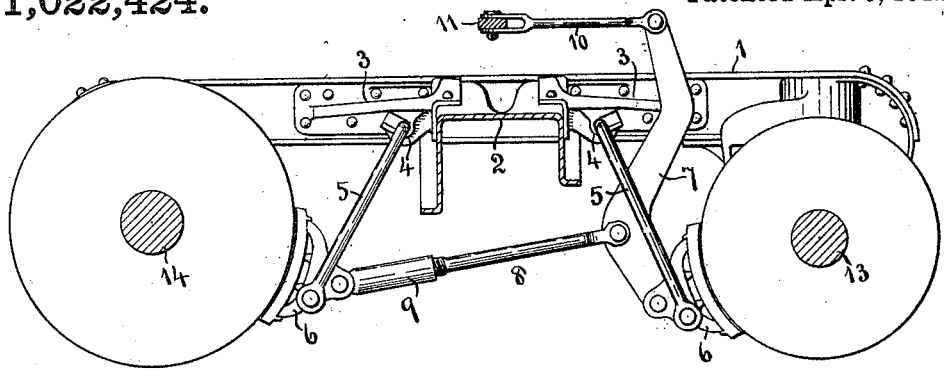
Figure 2:
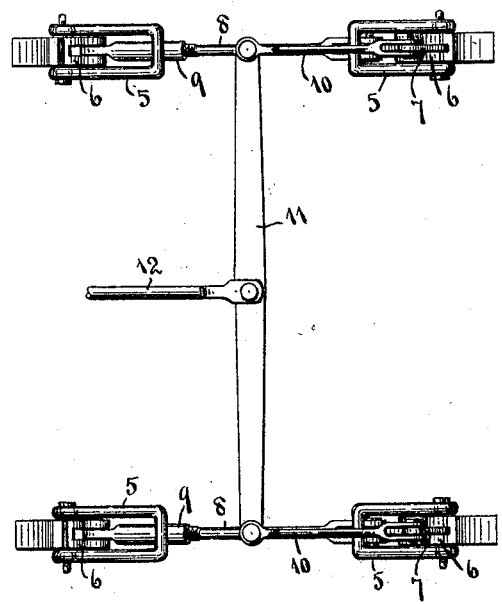

Figure 1 presents a side elevation of the brake rigging at one side of the truck, with the truck frame and axles shown as sectioned upon a longitudinal line through the center of the truck; and Fig. 2, a plan view of the complete brake rigging detached from the truck.

Like numerals designate like parts in the two views.

The truck frame, as described in my said co-pending application, has side frames composed of H-beams 1, fastened at each end to pedestals and connected together adjacent the center of the truck by a pressed steel transom 2, the ends of the transom being riveted to the webs of the H-beams, and further attached to said beams by gusset castings 3, said gussets being provided with depending brackets 4, to receive the horizontal members of the inverted U-shaped hangers 5, to which the brake heads 6 are coupled.

On the side toward the trailer axle 13, bent levers 7 rise from their couplings with the brake heads to a point above the truck frame, said levers being so bent as to clear the gusset castings 3. From the bent levers 7 adjustable compression rods run to the opposite brake heads, said rods being made in two parts, 8 and 9, the one adapted to be screwed into the other, to properly adjust the brake shoes to the wheels. These brake elements are duplicates of one another on each side of the truck, and the upper ends of the levers 7 are coupled by links 10 to an equalizer bar 11, which, in turn, is connected by a link 12 with the brake operating system. It will be noted that the equalizing bar is arranged above the bolster 2 and that the draft rod 12 is pivotally connected to the middle of the bar closely in line with the center around which the truck turns. By this arrangement distortion of the brake connections when the truck is moved around curves is prevented. It will also be noted that the ends of the equalizer bar are substantially in the planes of the respective brake levers 7 and their connections to the brakes proper.

This invention is particularly designed for motor trucks and in the drawing the larger wheels, upon the axle 14, are designed as driving wheels, and the smaller wheels, upon the axle 13, are trailers. The driving wheels ordinarily carry the weight of the motor and it is desirable to apply greater braking power to them in consequence. The leverage shown in the drawings is particularly adapted for this purpose although it can be used in connection with trucks which have no driving wheels.

In operating the brakes, a pull to the left on the equalizer bar will thrown the lower ends of the levers 7 to the right and the compression bars to the left, thereby setting the brake shoes against the trailer and driving wheels respectively; the compression bars acting as fulcrums for the levers 7. The brake heads on opposite sides are thus acted upon independently of each other, the levers and compression bars constituting leverage systems, whereby the braking force will be applied in desired ratio upon each pair of wheels. Moreover, by this arrangement of the brake elements, it will be noted that I eliminate the use of any levers between the transom and the motor axle 14.

What I claim as my invention and desire to secure by Letters Patent is—

1. In a four wheel car truck, the combination with the truck frame, including the bolster, of driving and trailer wheels, brake heads adjacent said wheels, U-shaped hangers pivotally connected with said brake heads and suspended from the truck frame, vertical levers pivotally connected to the brake heads of the trailer wheels and extending upward through the hangers of said brake heads, compression rods connected to said levers above the brake heads and pivotally connected to the respective brake heads of the driving wheels, and an equalizing bar connected to said levers, the ends of the equalizing bars being substantially in the same vertical planes with the respective wheels, levers, hangers, brake heads and compression rods, for the purpose set forth.

2. In a four wheel car truck, the combination with the truck frame, including the bolster, of brake heads adjacent one pair of said wheels, hangers connected with the truck frame and supporting said brake heads, levers extending upward from said brake heads to a plane above the car truck, brake heads adjacent the other pair of said wheels, hangers supporting said brake heads from the car truck, compression rods connecting said latter brake heads with the respective levers at points above the brake heads to which said levers are connected, and an equalizing bar above the car truck and adjacent the pivotal center thereof, the ends of said bar being connected with the upper ends of said levers, for the purpose set forth.

3. In a four wheel car truck, the combination with the truck frame comprising side bars, a transom, and gussets connecting the side bars and transom, of hook members on the gussets, U-shaped hangers pivotally suspended from said hook members, brake heads pivotally arranged between the arms of said U-shaped hangers, levers extending vertically from one pair of said brake heads to a plane above the car truck, compression rods connecting the other pair of said brake heads to the levers at points above the said brake heads to which the levers are connected, the said levers being located between the members of their respective U-shaped hangers, an equalizer bar arranged near the pivotal center of the truck, the ends of said equalizer bar being substantially in the planes of said levers, links connecting the ends of the equalizer bar with the upper ends of the levers, and a draft rod connected with the central portion of the equalizer bar, for the purpose set forth.

In testimony whereof I have affixed my signature, in presence of two witnesses.

WILLIAM F. KIESEL, Jr.

Witnesses:
J. Foster Meck,
J. C. Storm.